United States Patent [19]

Kossmehl et al.

[11] Patent Number: 4,490,509

[45] Date of Patent: Dec. 25, 1984

[54] POLY-(2,5-THIOPHENDIYL)ARSENIC PENTAFLUORIDE COMPLEXES

[75] Inventors: Gerhard Kossmehl; Georg Chatzitheodorou, both of Berlin, Fed. Rep. of Germany

[73] Assignee: Bayer Aktiengesellschaft, Leverkusen, Fed. Rep. of Germany

[21] Appl. No.: 396,162

[22] Filed: Jul. 8, 1982

Related U.S. Application Data

[63] Continuation-in-part of Ser. No. 376,590, May 10, 1982, abandoned.

[30] Foreign Application Priority Data

May 16, 1981 [DE] Fed. Rep. of Germany ....... 3119593

[51] Int. Cl.$^3$ ............................ C08K 5/34; H01B 1/06
[52] U.S. Cl. ................................. 525/328.5; 525/360; 252/518; 429/209; 429/212; 549/3

[58] Field of Search .................. 549/3; 525/328.5, 360

[56] References Cited

PUBLICATIONS

*Journal of Polymer Science*, vol. 18, No. 1, pp. 9–12 (Jan., 1980).
Makromol. Chem., Rapid Communications, vol. 2, pp. 551–555 (Oct. 1, 1981).

*Primary Examiner*—Alan Siegel
*Attorney, Agent, or Firm*—Connolly and Hutz

[57] ABSTRACT

Reaction products of poly-(2,5-thiophendiyl) and arsenic pentafluoride.

The black complexes are insoluble solids. Due to their high electric conductivity they can be used as conductors of electric currents. Suitable applications are, e.g., sheet-form conductors for heating systems or electrodes for electrical batteries.

2 Claims, No Drawings

POLY-(2,5-THIOPHENDIYL)ARSENIC PENTAFLUORIDE COMPLEXES

Continuation in part of Ser. No. 376,590, 5-10-82, abandoned.

This invention relates to poly-(2,5-thiophendiyl) doped with arsenic pentafluoride and to a process for the production thereof.

Poly-(2,5-thiophendiyl) is known and, according to Journal of Polymer Sci., Polymer Letters 18, 8 (1980), may be obtained by reacting 2,5-dibromothiophene with magnesium in the presence of nickel chloride in absolute tetrahydrofuran. The doping of this product with arsenic pentafluoride is new. The complex with arsenic pentafluoride is obtained by allowing gaseous arsenic pentafluoride to act on solid poly-(2,5-thiophendiyl) for from a few minutes to several days in the absence of air at about $+10°$ to $+30°$ C., i.e. in the absence of oxygen and moisture and under pressures from 0.1 mbar to atmospheric pressure Instead of starting with poly-(2.5-thiophendiyl), it is possible, and preferred, to treat thiophene or 2,2'-dithienyl or mixtures thereof with arsenic pentafluoride under the above-described conditions.

In every case, black insoluble polymeric complexes are obtained (in the form of powders or even films on the walls of the vessel) which do not melt at temperatures of up to 360° C. and which have an electric conductivity of up to $\delta 298$ K $-0.02 \Omega^{-1} \cdot cm^{-1}$ (as measured at $P=1500$ Kp $\cdot cm^{-2}$ in the range from 20° to 120° C. [for the measuring technique, see J. Danhauser, G. Manecke, Makromol. Chem. 84, 238 (1964)].

The black complexes are insoluble solids. Due to their high electric conductivity they can be used as conductors of electric currents. Suitable applications are, e.g., sheet-form conductors for heating systems or electrodes for electrical batteries.

EXAMPLES

1. Starting products:

1 = poly-(2,5-thiophendiyl) obtained from 2,5-dibromothiophene in accordance with J. Polymer Sci., Polymer Letters 18, 8 (1980); electrical conductivity $\delta 298$ K $=5.7 \cdot 10^{-11} \Omega^{-1} \cdot cm^{-1}$ (cf. Table 1, No. 1).
2 = 2,2'-dithienyl
3 = thiophene.

2. Production Process

The starting material was placed in a vacuum and arsenic pentafluoride allowed to act on it at room temperature for the periods under the pressures in Table 1. Black complexes having melting points above 360° C. were obtained in every case, the electrical data thereof being shown in Table 1:

TABLE 1

Poly-(2,5-thiophendiyl)-AsF$_5$—complexes

| No. | Starting material | AsF$_5$, pressure (Torr) | Time (h) | $\sigma$ 298K [$\Omega^{-1} \cdot cm^{-1}$] | $\sigma°$ [$\Omega^{-1} \cdot cm^{-1}$] | E [eV] | |
|---|---|---|---|---|---|---|---|
| 1 | 1 | — | — | $5.7 \cdot 10^{-11(b)}$ | $2.4 \cdot 10^{-5}$ | 0.66 | |
| 2 | 1 | 40 | 24 | $5.9 \cdot 10^{-8}$ | $2.7 \cdot 10^{+1}$ | 1.02 | |
| 3 | 1 | 200 | 24 | $5.4 \cdot 10^{-4}$ | $6.4 \cdot 10^{-1}$ | 0.36 | |
| 4 | 1 | 450 | 24 | $1.4 \cdot 10^{-3}$ | $1.6 \cdot 10^{-1}$ | 0.24 | |
| 5 | 2 | 450 | 60 | $7.1 \cdot 10^{-4}$ | $2.9 \cdot 10^{-2}$ | 0.19 | |
| 6 | 2 | 650 | 24 | $5.5 \cdot 10^{-4}$ | $5.0 \cdot 10^{-3}$ | 0.11 | |
| 7 | | 650 | 24 | $1.7 \cdot 10^{-3}$ | $2.5 \cdot 10^{-2}$ | 0.14 | = No. 6, treated |
| 8$^{(a)}$ | 2 | 450 | 60 | $1.5 \cdot 10^{-5}$ | $5.2 \cdot 10^{-2}$ | 0.42 | with NH$_4$OH and |
| 9 | 3 | 200 | 24 | $6.9 \cdot 10^{-8}$ | $1.9 \cdot 10°$ | 0.88 | redoped with |
| 10 | 3 | 300 | 24 | $6.5 \cdot 10^{-7}$ | $1.7 \cdot 10^{-2}$ | 0.52 | AsF$_5$ |
| 11 | | | | $1.2 \cdot 10^{-15}$ | $6.6 \cdot 10^{+1}$ | 1.98 | = No. 10, treated |
| 12 | 3 | 450 | 60 | $2.1 \cdot 10^{-2}$ | $4.8 \cdot 10^{-2}$ | 0.04 | for 3 days with |
| 13 | 3 | 650 | 48 | $7.4 \cdot 10^{-4}$ | $2.2 \cdot 10^{-2}$ | 0.17 | H$_2$O |
| 14$^{(a)}$ | 3 | 650 | 48 | $1.1 \cdot 10^{-3}$ | $2.2 \cdot 10^{-3}$ | 0.04 | |

$^{(a)}$A film formed on the walls of the vessel (No. 8 = 0.0046 cm thick; No. 14 = 0.004 cm thick)
$^{(b)}$291K = $5.3 \cdot 10^{-11} \Omega^{-1} \cdot cm^{-1}$ (cf. T. Yamamoto, K. Sanechika, A. Yamamoto, J. Polymer Sci., Polymer Letters 18,8 (1980)).

I claim:

1. Poly-(2,5-thiophendiyl) doped with arsenic pentafluoride.

2. A process for the production of poly-(2,5-thiophendiyl) doped with arsenic pentafluoride, wherein poly-(2,5-thiophendiyl) or 2,2'-dithienyl or thiophene or mixtures of 2,2'-dithienyl and thiophene is/are treated with gaseous arsenic pentafluoride in the absence of oxygen and moisture at $+10°$ to $+30°$ C. under pressures of from 0.1 mbar to atmospheric pressure.

* * * * *